(12) United States Patent
Lens et al.

(10) Patent No.: US 6,657,038 B1
(45) Date of Patent: Dec. 2, 2003

(54) METHOD FOR MAKING COPOLYCARBONATES

(75) Inventors: Jan Pleun Lens, Breda (NL); Jan Henk Kamps, Bergen op Zoom (NL)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/284,567

(22) Filed: Nov. 1, 2002

(51) Int. Cl.[7] .............................................. C08G 64/00
(52) U.S. Cl. ..................... 528/196; 264/219; 528/198
(58) Field of Search ...................... 264/219; 528/196, 528/198

(56) References Cited

U.S. PATENT DOCUMENTS

| | | | |
|---|---|---|---|
| 5,336,751 A | 8/1994 | Raymond, II | |
| 5,384,388 A | 1/1995 | Sakashita et al. | |
| 5,412,061 A | * 5/1995 | King et al. | ............... 528/198 |
| 5,418,317 A | 5/1995 | Raymond, III | |
| 5,420,192 A | 5/1995 | Ishiwa et al. | |
| 5,510,450 A | 4/1996 | Sakashita et al. | |
| 5,565,515 A | 10/1996 | Ishiwa et al. | |
| 5,602,201 A | 2/1997 | Fujiguhi et al. | |
| 5,606,009 A | 2/1997 | Sakashita et al. | |
| 5,717,056 A | 2/1998 | Varadarajan et al. | |
| 6,228,973 B1 | * 5/2001 | McCloskey et al. | ......... 528/196 |
| 6,316,575 B1 | * 11/2001 | Kuze et al. | ................. 528/196 |

FOREIGN PATENT DOCUMENTS

| | | |
|---|---|---|
| EP | 0508775 | 8/1998 |
| JP | 0508774 | 7/1998 |

\* cited by examiner

*Primary Examiner*—Terressa M. Boykin
(74) *Attorney, Agent, or Firm*—Andrew J. Caruso; Patrick K. Patnode

(57) ABSTRACT

A melt polymerization method is presented which permits the efficient preparation of copolycarbonates in which one or more of the constituent dihydroxy. aromatic compounds employed is relatively volatile, having a boiling point of less than about 340° C. Relatively volatile dihydroxy aromatic compounds are illustrated by dihydroxybenzenes such as hydroquinone, methyl hydroquinone and resorcinol. Known methods for the preparation of members of this class of copolycarbonates, such as the melt reaction of bisphenol A and resorcinol diphenyl carbonate in the presence of sodium hydroxide and tetraalkylammonium salt catalyst systems, suffer losses in efficiency due to the resorcinol being entrained out of the polymerization mixture with by-product phenol. Catalyst systems including quaternary phosphonium salts are shown to have improved performance with respect to the amount of volatile dihydroxy aromatic compound actually incorporated into the product copolycarbonate.

32 Claims, No Drawings

METHOD FOR MAKING COPOLYCARBONATES

BACKGROUND OF THE INVENTION

This invention relates to the preparation of copolycarbonates prepared by the melt polymerization reaction of at least two dihydroxy aromatic compounds with one or more diaryl carbonates, at least one of the dihydroxy aromatic compounds being having a substantial degree of volatility and thus being difficult to incorporate into the product copolycarbonate by conventional methods.

Polycarbonates have excellent impact resistance and other mechanical properties as well as excellent heat resistance and transparency. Polycarbonates are widely used in applications ranging from football helmets to automobile parts to transparent security windows. More recently, polycarbonates have also proven to be the material of choice for optical media applications such as optical discs, for example compact discs (CD) and digital versatile discs (DVD). Conventional polycarbonates are usually produced by (1) an interfacial polymerization, in which bisphenol A (BPA) is reacted directly with phosgene or (2) a melt polymerization process in which BPA is transesterified with a carbonic acid diester such as diphenyl carbonate (DPC). For many applications, there has been a need for materials possessing the fundamental characteristics of transparency and toughness inherent in BPA polycarbonate but possessing, in addition, certain improvements in physical properties relative those possessed by bisphenol A polycarbonate (BPA-PC), for example birefringence. For some applications improved chemical resistance relative to BPA polycarbonate is required, for example in certain medical and automotive applications. Copolycarbonates are materials frequently possessing the fundamental traits of BPA polycarbonate, transparency and toughness, but in certain instances also possessing improved performance characteristics for a given application relative to BPA polycarbonate.

One example of such a copolycarbonate comprises repeat units derived from resorcinol or hydroquinone in addition to repeat units derived from bisphenol A. The incorporation of resorcinol-derived and hydroquinone-derived repeat units into a BPA-polycarbonate confers excellent melt flow properties, molding properties, solvent and heat resistance, while maintaining the excellent mechanical properties and transparency inherent in bisphenol A polycarbonate. Such copolycarbonates can be prepared by interfacial polymerization, melt polymerization, or solid state polymerization. The present invention relates to an improved method to prepare these and related copolycarbonates using the melt polymerization method.

In conventional melt polycondensation processes, bisphenol A polycarbonate is prepared by reacting bisphenol A with diphenyl carbonate in a molten state. Generally a catalyst comprising a quaternary ammonium salt such as tetramethylammonium hydroxide (TMAH), and an alkali or alkali earth metal hydroxide, such as sodium hydroxide (NaOH), is used to catalyze the polymerization reaction. During the melt polymerization process the reactants and products are subjected to high temperature and low pressure while by-product phenol is distilled from the reaction mixture. While copolycarbonates comprising repeat units derived from relatively volatile dihydroxy aromatic compounds, such as resorcinol and hydroquinone, may be prepared in a similar fashion much of the volatile comonomer may be lost during the polymerization reaction. Loss of the volatile comonomer presents significant engineering challenges, and with them stark economic penalties, when attempting to manufacture copolycarbonate comprising repeat units derived from one or more relatively volatile dihydroxy aromatic compounds via the melt polymerization process. The present invention solves these and other problems and provides a method for preparing copolycarbonates which incorporates volatile comonomers with greater efficiency than known methods.

BRIEF SUMMARY OF THE INVENTION

The present invention provides a method of preparing a copolycarbonate, said method comprising contacting under melt polymerization conditions at least one first dihydroxy aromatic compound, and at least one second dihydroxy aromatic compound, with at least one diaryl carbonate having structure I

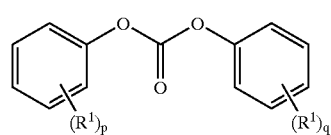

wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; and p and q are independently integers 0–5;

and at least one melt polymerization catalyst, said catalyst comprising at least one metal hydroxide and at least one quaternary phosphonium salt having structure II

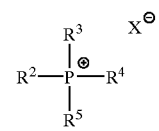

wherein $R^2$–$R^5$ are independently a $C_1$–$C_{20}$ aliphatic radical, $C_4$–$C_{20}$ cycloaliphatic radical or a $C_4$–$C_{20}$ aromatic radical, and $X^-$ is an organic or inorganic anion;

said first dihydroxy aromatic compound having a boiling point at atmospheric pressure, said boiling point being less than about 340° C.

In a further aspect the present invention relates to copolycarbonates prepared by the method of the present invention.

DETAILED DESCRIPTION OF THE INVENTION

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "copolycarbonate" refers to polycarbonates incorporating repeat units derived from at least two dihydroxy aromatic compounds and includes and copolyestercarbonates, for example a polycarbonate comprising repeat units derived from resorcinol, bisphenol A, and dodecandioic acid.

"BPA" is herein defined as bisphenol A or 2,2-bis(4-hydroxyphenyl)propane.

As used herein, the term "copolycarbonate of bisphenol A" refers to a copolycarbonate comprising repeat units derived from BPA and at least one other dihydroxy aromatic compound.

As used herein, the term "melt polycarbonate" refers to a polycarbonate made by the transesterification of a diaryl carbonate with a dihydroxy aromatic compound.

"Catalyst system" as used herein refers to a catalyst or catalysts that catalyze the transesterification of a dihydroxy aromatic compound with a diaryl carbonate in the preparation of melt polycarbonate.

"Catalytically effective amount" refers to an amount of a catalyst at which catalytic performance is exhibited.

As used herein the term "Fries product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, bisphenol A polycarbonate prepared by a melt reaction method in which Fries reaction occurs, affords 2-carboxy bisphenol A upon complete hydrolysis of the product polycarbonate.

The terms "Fries product" and "Fries group" are used interchangeably herein.

The terms "Fries reaction" and "Fries rearrangement" are used interchangeably herein.

As used herein the term "dihydroxy aromatic compound" means a an aromatic compound which comprises two hydroxy groups, for example a bisphenol such as bisphenol A or a dihydroxy benzene such as resorcinol.

As used herein the term "hydroxy aromatic compound" means a phenol, such as phenol or p-cresol, comprising a single reactive hydroxy group.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene, and the like.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

As mentioned, the present invention provides a method of preparing a copolycarbonate said method comprising contacting under melt polymerization conditions at least one first dihydroxy aromatic compound, and at least one second dihydroxy aromatic compound, with at least one diaryl carbonate having structure I and at least one melt polymerization catalyst, said catalyst comprising at least one metal hydroxide and at least one quaternary phosphonium salt having structure II, said phosphonium salt comprising an anion $X^-$ which is an organic or inorganic anion, said first dihydroxy aromatic compound having a boiling point at atmospheric pressure less than about 340° C.

As noted, the dihydroxy aromatic compound denoted the "first dihydroxy aromatic compound" has a boiling point of less than about 340° C., preferably less than about 320° C. and is more volatile than the dihydroxy aromatic compound designated the "second dihydroxy aromatic compound". For example, let the first dihydroxy compound be hydroquinone which has a boiling point of about 285° C. and the second dihydroxy aromatic compound be bisphenol A which is considerably less volatile than hydroquinone. A key feature of the present invention is that the method allows a relatively volatile dihydroxy aromatic compound such as hydroquinone or resorcinol to be efficiently copolymerized with a less volatile dihydroxy aromatic compound such as bisphenol A and a diaryl carbonate such as diphenyl carbonate while minimizing loss of the more volatile dihydroxy aromatic compound as a result of its volatility and entrainment with the hydroxy aromatic compound by-product, for example phenol, formed during the melt polymerization reaction. Boiling points for a very large number of dihydroxy aromatic compounds are known in the chemical literature and may be found in readily available publications such as the Aldrich Handbook of Fine Chemicals and Laboratory Equipment 2003–2004 Edition which is available from the Sigma-Aldrich Corporation USA and which is incorporated herein by reference. Frequently, boiling points are given which reference pressures other than about atmospheric pressure. The boiling point at atmospheric pressure for a given compound may be estimated with reasonable accuracy using a boiling point nomograph, such as that found in P. H. Rhodes, The Organic Chemist's Desk Reference (1995), page 150. Thus, when referring to a first dihydroxy aromatic compound having a boiling point of less than about 340° C., it is meant that either the known boiling point at atmospheric pressure is less than 340° C. or its boiling point at atmospheric pressure estimated using a boiling point correction graph (nomograph) or like means, is less than about 340° C. Like means for estimating boiling points include a computer program designed to estimate boiling points at atmospheric pressure based upon known boiling points at pressures other than atmospheric pressure. Additional like means for estimating boiling points include estimation of boiling points within a homologous series. For example, hydroquinone has a boiling point of about 285° C. The boiling point of the next highest member in a homologous series of compounds based upon hydroquinone, methylhydroquinone, is estimated to be about 10 to 20° C. higher than that of hydroquinone itself based on the known effect on boiling point (bp) of an additional methylene group within a homologous series. This effect is illustrated by the boiling points of phenol (bp 182° C.), o-cresol (bp 191° C.), and m-cresol (bp 203° C.). Finally, like means for estimating boiling points include modern "ab initio" computational methods of determining boiling points.

Typically, the first dihydroxy aromatic compound is selected from the group consisting of dihydroxy benzenes having structure III

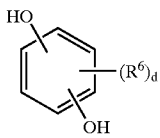

wherein $R^6$ is independently at each occurrence a halogen atom, or a $C_1$–$C_5$ alkyl radical; and d is an integer from 0 to 4.

Dihydroxy benzenes having structure III are illustrated by resorcinol; 4-methylresorcinol; 5-methylresorcinol; hydroquinone; 2-methylhydroquinone; 2-ethylhydroquinone; 2,5-dimethylhydroquinone; 2,6-dimethylhydroquinone; catechol; 3-methylcatechol; 4-methylcatechol; and a mixture thereof.

As noted, said second dihydroxy aromatic compounds are less volatile than said first dihydroxy aromatic compounds. Typically, said second dihydroxy aromatic compound is a bisphenol having structure IV

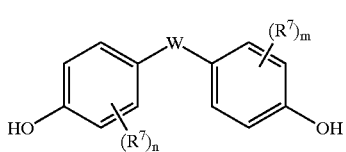

wherein $R^7$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group;

n and m are independently integers 0–4;

W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

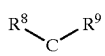

wherein $R^8$ and $R^9$ are independently a hydrogen atom, $C_1$–$C_{20}$ alkyl group, $C_4$–$C_{20}$ cycloalkyl group, or $C_4$–$C_{20}$ aryl group; or $R^8$ and $R^9$ together form a $C_4$–$C_{20}$ cycloaliphatic ring which is optionally substituted by one or more $C_1$–$C_{20}$ alkyl, $C_6$–$C_{20}$ aryl, $C_7$–$C_{21}$ aralkyl, $C_5$–$C_{20}$ cycloalkyl groups or a combination thereof.

Bisphenols having structure IV are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl )propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl )-3,3,5-trimethylcyclohexane; 1,1-bis(4-hydroxy-2,3,5,6-tetramethylphenyl)-3,3,5-trimethylcyclohexane; 1,1-bis(2, 6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; and 1,4-bis(2-(4-hydroxy-3-methylphenyl)-2-propyl)benzene. In many applications due to its relatively high reactivity, thermal stability, and low cost, bisphenol A is preferred.

As noted, diaryl carbonates having structural formula I are employed according to the method of the present invention. Diaryl carbonates having structure I are illustrated by diphenyl carbonate, bis(4-methylphenyl) carbonate, bis(4-chlorophenyl) carbonate, bis(4-fluorophenyl) carbonate, bis(2-chlorophenyl) carbonate, bis(2,4-difluorophenyl) carbonate, bis(4-nitrophenyl) carbonate, bis(2-nitrophenyl) carbonate, and bis(4-bromophenyl) carbonate. Diphenyl carbonate if frequently preferred.

The melt polymerization catalyst employed according to the method of the present of the present invention is at least one quaternary phosphonium salt having structure II

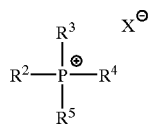

wherein $R^2$–$R^5$ are independently a $C_1$–$C_{20}$ aliphatic radical, $C_4$–$C_{20}$ cycloaliphatic radical or a $C_4$–$C_{20}$ aromatic radical, and $X^-$ is an organic or inorganic anion.

Suitable anions $X^-$ are illustrated by hydroxide, halide, carboxylate, phenoxide, sulfonate, sulfate, carbonate, and bicarbonate. Carboxylate anions are frequently preferred. Where $X^-$ is a polyvalent anion such as carbonate or sulfate it is understood that the positive and negative charges in phosphonium salt II are properly balanced. For example, where $R^2$–$R^5$ in structure II are each methyl groups and $X^-$ is carbonate, it is understood that $X^-$ represents ½ $(CO_3^{-2})$.

Quaternary phosphonium salt having structure II are illustrated by tetramethylphosphonium hydroxide, tetraphenylphosphonium hydroxide, tetraphenylphosphonium acetate, tetramethylphosphonium formate, tetrabutylphosphonium hydroxide, and tetrabutylphosphonium acetate. Tetraphenylphosphonium acetate and tetrabutylphosphonium acetate are frequently preferred.

The melt polymerization catalyst used according to the present invention, in addition to comprising a quaternary phosphonium salt also comprises a metal hydroxide. Typically, the metal hydroxide is an alkali metal hydroxide, for example sodium hydroxide, lithium hydroxide or potassium hydroxide, or an alkaline earth metal hydroxide, for example calcium hydroxide. Mixtures of one or more alkali metal hydroxides may be employed, as may be mixtures of one or more alkaline earth metal hydroxides. In addition, mixtures of one or more alkali metal hydroxides with one or more alkaline earth metal hydroxides may be employed as part of the melt polymerization catalyst system.

In one embodiment of the present invention, at least one first dihydroxy aromatic compound and at least one second dihydroxy aromatic compound are employed in amounts such that the molar ratio of the first dihydroxy aromatic compound to the second dihydroxy aromatic compound is in a range between about 0.01 and about 4. Where the first dihydroxy aromatic compound comprises two or more compounds, for example a mixture of resorcinol and hydroquinone, and the second dihydroxy compound is a single compound, for example BPA, the molar ratio of the first dihydroxy aromatic compound to the second dihydroxy aromatic compound is expressed as the sum of the number of moles of resorcinol and hydroquinone used divided by the number of moles of BPA used. Similarly, where the first dihydroxy aromatic compound comprises but a single compound, for example resorcinol, and the second dihydroxy aromatic compound comprises a mixture of compounds, for example, BPA and BPZ (1,1-bis(4-hydroxyphenyl)cyclohexane), the molar ratio of the first dihydroxy aromatic compound to the second dihydroxy aromatic compound is expressed as the number of moles of resorcinol used divided by the sum of the number of moles of BPA and BPZ used. As mentioned, in one embodiment the molar ratio of the first dihydroxy aromatic compound to the second dihydroxy aromatic compound is in a range between about 0.01 and about 4. In an alternate embodiment said molar ratio of the first dihydroxy aromatic compound to the second dihydroxy aromatic compound is in a range between about 0.05 and about 0.7. A copolycarbonate prepared according to the method of the present invention using resorcinol as the first dihydroxy aromatic compound and BPA as the second dihydroxy aromatic compound in which the molar ratio of resorcinol to BPA was about 0.7 could contain as much as about 41 mole percent resorcinol derived repeat units if no loss occurred during the polymerization reaction. One aspect of the present invention is that loss of at least some of the more volatile monomer is inevitable under melt polymerization conditions which involve the removal from the reaction mixture by distillation of a significant amount of a hydroxy aromatic compound by-product, typically phenol, under conditions of high temperature and low pressure. In one aspect the method of the present invention minimizes the loss of the more volatile first dihydroxy aromatic compound from the polymerization mixture and maximizes the incorporation of repeat units derived from the first dihydroxy aromatic compound in the product copolycarbonate.

Typically, the method of the present invention is carried out such that the amount of diaryl carbonate I employed corresponds to a molar ratio of diaryl carbonate I to all dihydroxy aromatic compounds, i.e. said first and said second dihydroxy aromatic compounds, initially present in the reaction mixture, said molar ratio being in a range between about 0.90 and about 1.20, preferably between about 1.01 and about 1.10.

The term "contacting under melt polymerization conditions" will be understood to mean those conditions necessary to effect reaction between the diary carbonate and the dihydroxy aromatic compounds employed according to the method of the present invention. The reaction temperature is typically in the range between about 150° C. and about 350° C., more preferably between about 180° C. and about 310° C. The pressure may be at atmospheric pressure, supraatmospheric pressure, or a range of pressures, for example from about 2 atmospheres to about 15 torr in the initial stages of the polymerization reaction, and at a reduced pressure at later stages, for example in a range between about 15 torr and about 0.1 torr. The reaction time is generally in a range between about 0.1 hours and about 10 hours, preferably between about 0.1 and about 5 hours.

In order to achieve the formation of copolycarbonate using the method of the present invention an effective amount of catalyst must be employed. The amount of catalyst employed is typically based upon the total number of moles of first dihydroxy aromatic compound and second dihydroxy aromatic compound employed in the polymerization reaction. When referring to the ratio of catalyst, for example phosphonium salt II, to all dihydroxy aromatic compounds employed in the polymerization reaction, it is convenient to refer to moles of phosphonium salt "per mole of said first and second dihydroxy aromatic compounds combined", meaning the number of moles of phosphonium salt divided by the sum of the moles of each individual dihydroxy aromatic compound present in the reaction mixture.

Typically the amount of phosphonium salt II employed will be in a range between about $1 \times 10^{-2}$ and about $1 \times 10^{-5}$, preferably between about $1 \times 10^{-3}$ and about $1 \times 10^{-4}$ moles per mole of said first and second dihydroxy aromatic compounds combined.

Typically the metal hydroxide catalyst will be used in a an amount corresponding to between about $1 \times 10^{-4}$ and about $1 \times 10^{-8}$, preferably $1 \times 10^{-4}$ and about $1 \times 10^{-7}$ moles of metal hydroxide per mole of said first and second dihydroxy aromatic compounds combined.

The method of the present invention may be employed to provide both high molecular weight copolycarbonates. High molecular weight copolycarbonates are defined as copolycarbonates having a weight average molecular weight, $M_W$, greater than 15,000 daltons. The method of the present invention may also be employed to provide oligomeric copolycarbonates. Oligomeric copolycarbonates are defined as copolycarbonates as having weight average molecular weight, $M_W$, less than 15,000 daltons. The copolycarbonate of Example 1 exemplifies a high molecular weight copolycarbonate while the copolycarbonate of Example 2 exemplifies an oligomeric copolycarbonate, each being prepared by the method of the present invention.

In one aspect the method of present invention provides copolycarbonates comprising repeat units derived from at least two dihydroxy aromatic compounds, at least one of said dihydroxy aromatic compounds having a boiling point of about 340° C. or less. The copolycarbonates prepared according to method of the present invention are characterized as having lower Fries content than identically constituted copolycarbonates of the same molecular weight prepared by known methods. In one embodiment, the present invention provides a copolycarbonate comprising repeat units derived from at least one first dihydroxy aromatic compound and at least one second dihydroxy aromatic compound, said first dihydroxy aromatic compound having a boiling point at atmospheric pressure of less than about 340° C., said polycarbonate comprising residual phosphonium salt II or products derived from it in an amount corresponding to at least about three parts phosphorous per million parts of the copolycarbonate.

The copolycarbonates prepared using the method of the present invention may be blended with conventional additives such as heat stabilizers, mold release agents and UV stabilizers and molded into various molded articles such as optical disks, optical lenses, automobile lamp components and the like. Typically injection molding is preferred.

Further, the copolycarbonates prepared using the method of the present invention may be blended with other polymeric materials, for example, other polycarbonates, polyestercarbonates, polyesters and olefin polymers such as ABS.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, and temperature is in degrees centigrade (° C.).

Molecular weights are reported as number average ($M_n$) or weight average ($M_w$) molecular weight and were determined by gel permeation chromatography using polymer solutions comprising the product copolycarbonates at a concentration of about 1 milligram (mg) per milliliter (mL) in methylene chloride ($CH_2Cl_2$). The molecular weights are referenced to polystyrene (PS) molecular weight standards.

The composition of a given product copolycarbonate was determined by hydrolysis of the copolycarbonate to afford a solution of its constituent monomers. The solution was then diluted as appropriate and analyzed by high performance liquid chromatography (HPLC) to determine the weight percentages of the individual monomers present in the copolycarbonate.

MELT POLYMERIZATIONS

Reactions were carried out with BPA and different amounts of comonomer. In general the amount of comonomer employed is expressed in terms of its mole percentage. Mole percentage (mole %) as used herein is defined as 100×(number of moles of comonomer/(total moles monomer)). A slight excess of diphenyl carbonate (DPC) was employed, meaning that the amount of DPC expressed in moles was slightly greater than the stoichiometric amount required to effect complete reaction between all of the comonomers under ideal conditions. The slight excess of diphenyl carbonate is required because some of the DPC is lost due to volatilization particularly during the initial stages of the melt polymerization. In the Comparative Examples which follow the melt polymerization catalyst was tetramethylammonium hydroxide (TMAH) in combination with sodium hydroxide. In the Examples which follow the melt polymerization catalyst was tetrabutylphosphonium acetate (TBPA) in combination with sodium hydroxide. Catalysts were added as aqueous solutions, the volume added being about 100 microliters (□l). The melt polymerizations of Comparative Example 1 and Example 1 were carried out in a standard laboratory melt reactor constructed of glass and equipped for stirring a viscous melt and adapted for removal of volatile reaction by-products, for example phenol, at ambient or subambient pressure. The reactor was purged with nitrogen after being charged with reactants. The catalyst was added following the nitrogen purge. Upon completion of the melt polymerization reaction, the reactor was brought back to atmospheric pressure with a gentle nitrogen flow, and the polymer was recovered.

Comparative Example 1

The melt reactor was passivated by acid washing, rinsing and drying with nitrogen gas, was charged with 19.73 g of BPA, 2.38 g of resorcinol, 25.00 g of DPC, and 100 µl of an aqueous solution of TMAH and NaOH in an amount corresponding to about $2.5 \times 10^{-4}$ moles TMAH and about $2.5 \times 10^{-6}$ moles NaOH per the total number of moles of BPA and resorcinol combined. The temperature-pressure regime used to carry out the melt polymerization comprised the steps of heating for the indicated time periods at the indicated temperatures and pressures: (1) 15 minutes, 180° C., atmospheric pressure, (2) 45 min, 230° C., 170 mbar, (3) 30 min, 270° C., 20 mbar, (4) 30 min, 300° C., 0.5–1.5 mbar, respectively. During steps 1–4 phenol by-product was removed from the reaction mixture by distillation. After the final reaction stage, the product copolycarbonate was recovered and analyzed. The product copolycarbonate had a weight average molecular weight ($M_w$) of about 55,300 daltons and comprised about 70 percent of the initial resorcinol employed.

Example 1

The reaction was carried out as in Comparative Example 1 with the exception that the catalyst employed was 100 μl of an aqueous solution of TBPA and NaOH, said 100 μl of aqueous solution comprising TBPA and NaOH in an amount corresponding to about $1.0 \times 10^{-4}$ moles of TBPA and about $2.5 \times 10^{-6}$ Moles of NAOH per the total number of moles of BPA and resorcinol used in the melt polymerization. The temperature-pressure regime used to carry out the melt polymerization was identical to that used in Example 1. The product copolycarbonate had a weight average molecular weight ($M_w$) of about 54,800 daltons and comprised about 76 percent of the initial resorcinol employed.

Comparative Example 2

Molten mixtures of reactants diaryl carbonate, resorcinol and BPA were prepared batchwise in two separate first melt mixing tanks and were alternately recharged to provide a continuous flow of the molten reactants to a single second melt mixing tank. The molten mixture was fed from the second melt mixing tank to a first continuous stirred tank reactor (CSTR) at a rate corresponding to about 2019 grams DPC per hour, 1574 grams BPA per hour and 201 grams of resorcinol per hour. A catalyst solution consisting of an aqueous solution of TMAH and sodium hydroxide was continuously introduced into the first CSTR at a rate of about 6mL per hour, the amount of TMAH corresponding to about $2.5 \times 10^{-4}$ moles TMAH added for each mole of BPA and resorcinol combined being introduced into the first CSTR. Similarly, the amount of NaOH being added corresponded to about $2.5 \times 10^{-6}$ moles NaOH for each mole of BPA and resorcinol combined being introduced into the first CSTR. The first CSTR was maintained at a temperature of about 225° C. and a pressure of about 170 mbar. The output the first CSTR was introduced into a second CSTR said second CSTR being maintained at a temperature and pressure of about 260° C. and about 20mbar. Each of the first and second CSTR's was equipped for the removal of phenol by-product. The product was an oligomeric copolycarbonate which emerged from the second CSTR at a rate of about 1.8kg per hour. The product oligomeric copolycarbonate had a weight average molecular weight ($M_w$) of about 5,600 daltons and comprised about 72 mole percent of the initial resorcinol employed.

Example 2

The reaction was carried out as in Comparative Example 2 with the exception that the aqueous catalyst solution consisted of TBPA and NaOH. The amounts of TBPA and NaOH corresponded to about $1.25 \times 10^{-4}$ moles of TBPA and $2.5 \times 10^{-6}$ moles NaOH for each mole of BPA and resorcinol combined being fed. As in Comparative Example 2 the catalyst solution was added at about 6 mL per hour. The product was an oligomeric copolycarbonate which emerged from the second CSTR at a rate of about 1.8kg per hour. The product oligomeric copolycarbonate had a weight average molecular weight ($M_w$) of about 8,100 daltons and comprised about 82 mole percent of the initial resorcinol employed.

Data for Examples 1 and 2 and Comparative Examples 1 and 2 are gathered in Table 1 and show that although some resorcinol is invariably lost during the melt polymerization reaction (Example 1 and Comparative Example 1) or during the continuous oligomerization of Example 2 and Comparative Example 2, the use of the quaternary phosphonium salt catalyst gives consistently higher levels of resorcinol incorporation into the product copolycarbonate (Example 1 and Comparative Example 1) or oligomeric copolycarbonate (Example 2 and Comparative Example 2)

TABLE 1

HIGHER LEVELS OF CO-MONOMER RESORCINOL ACHIEVED THROUGH THE USE OF TBPA CATALYST

| Example | Catalyst | $M_w$ | % Resorcinol Incorporated |
|---|---|---|---|
| Comparative Example-1 | TMAH/NaOH | 55300 | 70% |
| Example-1 | TBPA/NaOH | 54800 | 76% |
| Comparative Example-2 | TMAH/NaOH | 5600 | 72% |
| Example-2 | TBPA/NaOH | 8100 | 82% |

The invention has been described in detail with particular reference to preferred embodiments thereof, but it will be understood by those skilled in the art that variations and modifications can be effected within the spirit and scope of the invention.

What is claimed is:

1. A method of preparing a copolycarbonate said method comprising contacting under melt polymerization conditions at least one first dihydroxy aromatic compound, and at least one second dihydroxy aromatic compound, with at least one diary carbonate having structure I

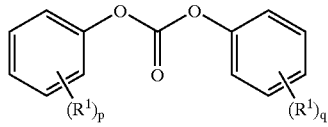

I wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; and p and q are independently integers 0–5;

and at least one melt polymerization catalyst, said catalyst comprising at least one metal hydroxide and at least one quaternary phosphonium salt having structure II

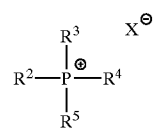

II wherein $R^2$–$R^5$ are independently a $C_1$–$C_{20}$ aliphatic radical, $C_4$–$C_{20}$ cycloaliphatic radical or a $C_4$–$C_{20}$ aromatic radical, and $X^-$ is an organic or inorganic anion;

said first dihydroxy aromatic compound having a boiling point at atmospheric pressure, said boiling point being less than about 340° C.

2. A method according to claim 1 wherein said first dihydroxy aromatic compound is selected from the group consisting of dihydroxy benzenes having structure III

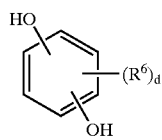

wherein $R^6$ is independently at each occurrence a halogen atom, or a $C_1$–$C_5$ alkyl radical; and d is an integer from 0 to 4.

3. A method according to claim 2 said dihydroxy benzene is selected from the group consisting of resorcinol; 4-methylresorcinol; 5-methylresorcinol; hydroquinone; 2-methylhydroquinone; 2-ethylhydroquinone; 2,5-dimethylhydroquinone; 2,6-dimethylhydroquinone; catechol; 3-methylcatechol; 4-methylcatechol; and a mixture thereof.

4. A method according to claim 1 wherein said second dihydroxy aromatic compound is a bisphenol having structure IV

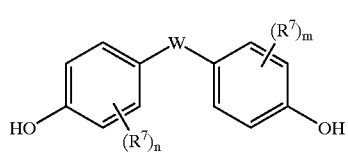

wherein $R^7$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group;

n and m are independently integers 0–4;

W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

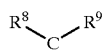

wherein $R^8$ and $R^9$ are independently a hydrogen atom, $C_1$–$C_{20}$ alkyl group, $C_4$–$C_{20}$ cycloalkyl group, or $C_4$–$C_{20}$ aryl group; or $R^8$ and $R^9$ together form a $C_4$–$C_{20}$ cycloaliphatic ring which is optionally substituted by one or more $C_1$–$C_{20}$ alkyl, $C_6$–$C_{20}$ aryl, $C_7$–$C_{21}$ aralkyl, $C_5$–$C_{20}$ cycloalkyl groups or a combination thereof.

5. A method according to claim 4 wherein said bisphenol is selected from the group consisting of 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyi)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethy-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl )cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6- tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; and 1,4-bis(2-(4-hydroxy-3-methylphenyl)-2-propyl)benzene.

6. A method according to claim 1 wherein said diaryl carbonate having structure I is selected from the group consisting of diphenyl carbonate, bis(4-methylphenyl) carbonate, bis(4-chlorophenyl) carbonate, bis(4-fluorophenyl) carbonate, bis(2-chlorophenyl) carbonate, bis(2,4-difluorophenyl) carbonate, bis(4-nitrophenyl) carbonate, bis(2-nitrophenyl) carbonate, and bis(4-bromophenyl) carbonate.

7. A method according to claim 1 wherein said anion is selected from the group consisting of hydroxide, halide, carboxylate, phenoxide, sulfonate, sulfate, carbonate, and bicarbonate.

8. A method according to claim 1 wherein said quaternary phosphonium salt having structure II is selected from the group consisting of tetramethylphosphonium hydroxide, tetraphenylphosphonium hydroxide, tetraphenylphosphonium acetate, tetramethylphosphonium formate, tetrabutylphosphonium hydroxide, and tetrabutylphosphonium acetate.

9. A method according to claim 8 wherein said phosphonium salt is tetrabutylphosphonium acetate.

10. A method according to claim 8 wherein said phosphonium salt is tetraphenylphosphonium acetate.

11. A method according to claim 1 wherein said metal hydroxide is selected from the group consisting of alkali metal hydroxides, alkaline earth metal hydroxides, and mixtures thereof.

12. A method according to claim 11 wherein said metal hydroxide is sodium hydroxide.

13. A method according to claim 1 wherein said first dihydroxy aromatic compound and said second dihydroxy aromatic compound have a molar ratio, said molar ratio being in a range between about 0.01 and about 4.

14. A method according to claim 13 wherein said ration is between about 0.05 and about 0.7.

15. A method according to claim 1 wherein said phosphonium salt is present in an amount corresponding to between about $1 \times 10^{-2}$ and about $1 \times 10^{-5}$ moles of phosphonium salt per mole of said first and second dihydroxy aromatic compounds combined.

16. A method according to claim 1 wherein said metal hydroxide is present in an amount corresponding to between about $1 \times 10^{-4}$ and about $1 \times 10^{-8}$ moles of metal hydroxide per mole of said first and second dihydroxy aromatic compounds combined.

17. A method according to claim 1 wherein said melt polymerization conditions comprise heating a reaction mixture from said first dihydroxy aromatic compound, said second dihydroxy aromatic compound, said diaryl carbonate having structure I, and said melt polymerization catalyst, at a temperature in a range between about 150° C. and about 310° C. and a pressure between about 2 atmospheres and about 0.1 torr.

18. A method of preparing a copolycarbonate of bisphenol A, said method comprising contacting under melt polymerization conditions at least one dihydroxy aromatic compound having structure III

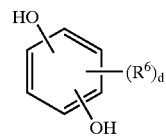

wherein $R^6$ is independently at each occurrence a halogen atom, or a $C_1$–$C_5$ alkyl radical; and d is an integer from 0 to 4;

with bisphenol A and diphenyl carbonate in the presence of a melt polymerization catalyst comprising a quaternary phosphonium salt II

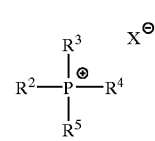

wherein $R^2$–$R^5$ are independently a $C_1$–$C_{20}$ aliphatic radical, $C_4$–$C_{20}$ cycloaliphatic radical or a $C_4$–$C_{20}$ aromatic radical, and $X^-$ is an organic or inorganic anion;

and a metal hydroxide, said dihydroxy aromatic compound III and said bisphenol A having a molar ratio, said molar ratio of dihydroxy aromatic compound III to bisphenol A to being in a range between about 0.01 and about 4.

19. A method according to claim 18 wherein said dihydroxy aromatic compound III is selected from the group consisting of resorcinol; 4-methylresorcinol; 5-methylresorcinol; hydroquinone; 2-methylhydroquinone; 2-ethylhydroquinone; 2,5-dimethylhydroquinone; 2,6-dimethylhydroquinone; catechol; 3-methylcatechol; 4-methylcatechol; and a mixture thereof.

20. A method according to claim 18 wherein said phosphonium salt is present in an amount corresponding to between about $1 \times 10^{-2}$ and about $1 \times 10^{-5}$ moles of phosphonium salt per mole of said dihydroxy aromatic compound and bisphenol A combined.

21. A method according to claim 18 wherein said metal hydroxide is present in an amount corresponding to between about $1 \times 10^{-4}$ and about $1 \times 10^{-8}$ moles of metal hydroxide per mole of said dihydroxy aromatic compound and bisphenol A combined.

22. A method according to claim 18 wherein said melt polymerization conditions comprise heating at a temperature in a range between about 150° C. and about 310° C. and a pressure between about 2 atmospheres and about 0.1 torr.

23. A copolycarbonate prepared by the method of claim 1.

24. A polymer blend comprising the copolycarbonate of claim 23.

25. A molded article comprising the copolycarbonate of claim 23.

26. A molded article comprising the polymer blend of claim 24.

27. A copolycarbonate prepared according to claim 1 said copolycarbonate comprising residual phosphonium salt II, or products derived from it, in an amount corresponding to at least about three parts phosphorous per million parts of the copolycarbonate.

28. A method of preparing a copolycarbonate of resorcinol and bisphenol A, said method comprising contacting under melt polymerization conditions resorcinol with bisphenol A and diphenyl carbonate in the presence of a melt polymerization catalyst comprising tetrabutylphosphonium acetate and an alkali metal hydroxide, said resorcinol and said bisphenol A having a molar ratio, said molar ratio of resorcinol to bisphenol A in a range between about 10 and about 0.1, said tetrabutylphosphonium acetate being present in an amount corresponding to between about $1\times10^{-2}$ and about $1\times10^{-5}$ moles of phosphonium salt per mole of said resorcinol and bisphenol A combined, said alkali hydroxide being present in an amount corresponding to between about $1\times10^{-4}$ and about $1\times10^{-8}$ moles of alkali metal hydroxide per mole of said resorcinol and said bisphenol A combined.

29. A copolycarbonate prepared by the method of claim 28.

30. A polymer blend comprising the copolycarbonate of claim 28.

31. A molded article comprising the copolycarbonate of claim 28.

32. A molded article comprising the polymer blend of claim 30.

* * * * *